Nov. 10, 1953  K. C. SINCLAIR  2,658,793
AUTOMOBILE DRAFT CONTROL DEFLECTOR
Filed Jan. 22, 1949
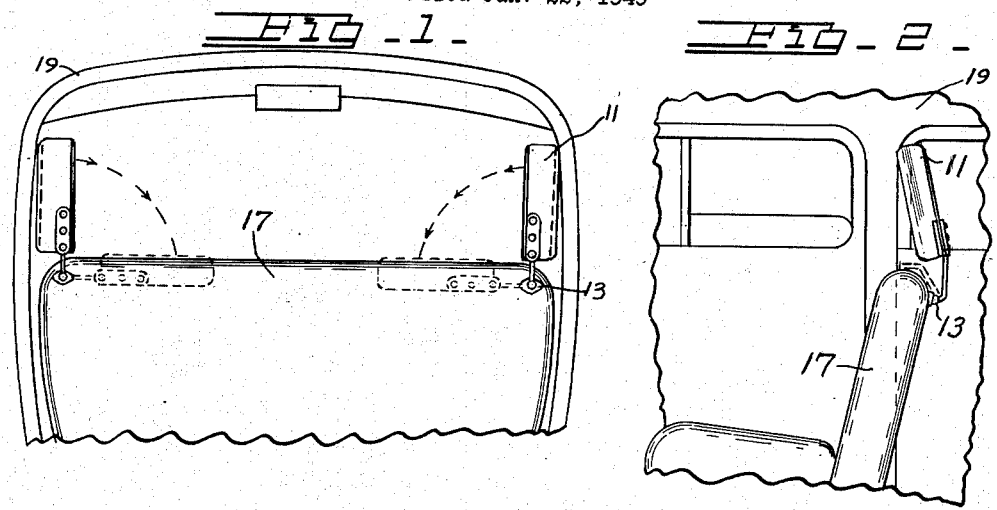
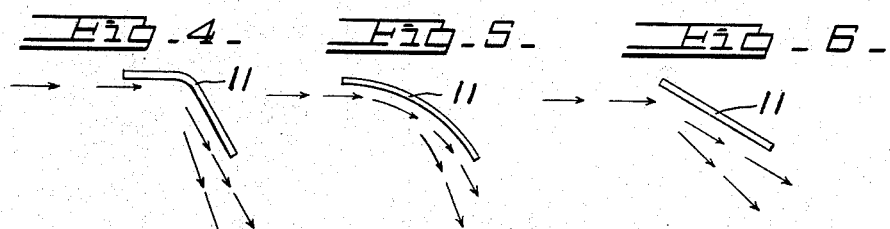
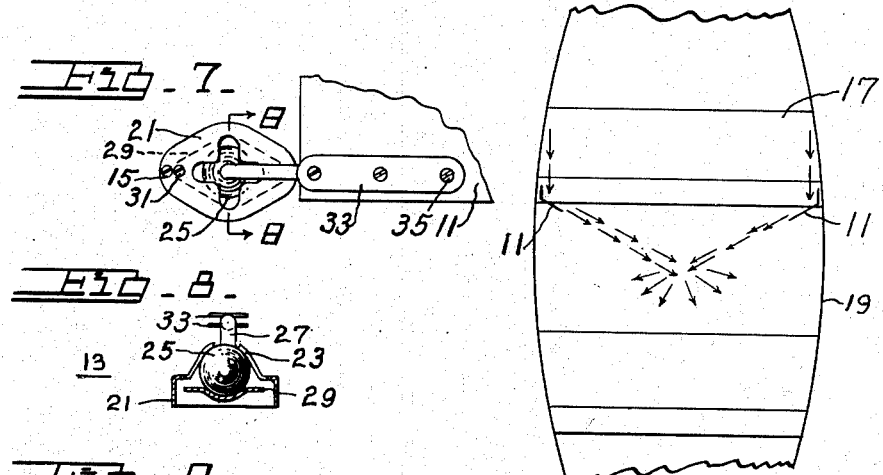
INVENTOR.
KENNETH C. SINCLAIR
BY
His Attorney Patented Nov. 10, 1953

2,658,793

UNITED STATES PATENT OFFICE 2,658,793

AUTOMOBILE DRAFT CONTROL DEFLECTOR

Kenneth C. Sinclair, Detroit, Mich.

Application January 22, 1949, Serial No. 72,242

4 Claims. (Cl. 296—85)

My invention pertains to an automobile draft control system and more especially to a particular mounting arrangement for mounting and adjustably setting air deflectors in a closed automobile body. This invention is an improvement of the invention disclosed and claimed in my copending patent application Serial No. 56,821, filed October 27, 1948.

It is an object of my invention to provide an improved arrangement and mounting of air deflector means in a closed automobile body for convenient adjustment to various set positions to deflect air currents away from the passengers on the rear seat, or to be easily folded into a compact unobstructing position.

It is also an object of my invention to provide in such a system of draft control an improved combination of air deflector shape and mounting such that the air deflectors may be supported on the back of the front seat for convenient folding thereon or for projection to a position along the side of the automobile body, or to other positions, for deflecting air currents away from the rear seat passengers.

My invention will be more readily understood, and additional objects and advantages thereof will become apparent by reading the following specification in conjunction with the appended drawings, wherein:

Fig. 1 is a fragmentary cross-sectional view through a closed automobile body just behind the front seat and looking toward the front for showing the improved arrangement of air deflectors mounted therein and adjusted to the air deflecting positions adjacent the sides of the body, the folded positions of the deflectors being shown in dotted lines;

Fig. 2 is a side elevational view showing the front seat from the left-hand side and showing the remote inner side of the right-hand side of the automobile, the nearest deflector being omitted and the remote or right-hand air deflector being shown in the same full line and dotted line positions as in Fig. 1;

Fig. 3 is diagrammatic view showing by means of dotted lines and arrows how the air currents may be controlled and deflected away from the passengers when set into draft eliminating positions;

Figs. 4, 5, and 6 are end elevational views showing air deflectors of various cross-sectional shapes which may be utilized, the deflection of air being represented by dotted lines, and arrows;

Fig. 7 is an elevational view showing an adjustable mounting which may be secured to the back of the front seat for holding an air deflector;

Fig. 8 is a section through the adjustable mounting on line 8—8 in Fig. 7, the deflector member being omitted; and Fig. 9 shows a modified mounting arm.

Referring more specifically to Fig. 1 of the drawing, it will be seen that I have illustratively disclosed my air deflectors 11 supported by adjustable mountings 13 secured, as by screws 15, to the rear side of the front seat 17 of an automobile body 19. One such deflector may be utilized, if desired. For example, many drivers wish to drive with their adjacent window open for convenience in signalling, or even to facilitate reception of audible or visual impressions. The draft of air admitted flows along the inside of the car body and impinges upon the passenger behind the driver. This air current is of high velocity, and, even in warm weather, it causes great discomfort because of its direct blast upon the passenger behind the driver. Then this air current flows around the back of the rear seat striking all the rear seat passengers on the backs of their necks and creating still further discomfort.

In accordance with my invention, this discomfort is eliminated by turning the air deflector 11 up along the inner side surface of the automobile body, to a suitable position to capture this high velocity air stream and to then divert or deflect it toward the center or axis of the car body. At this point the air current is dispersed, broken up or diffused, and the direct blast effect upon a rear seat passenger is eliminated. This also removes the cause of the draft on the backs of the necks of the rear seat passengers. Where two such air deflectors 11 are provided, of course both of these air controlling elements may be turned up to air deflecting positions at the same time, as shown in full lines in Fig. 1. Fig. 2 shows the air deflector on the right-hand side of the automobile body, as it stands up in air deflecting position.

Fig. 3 diagrammatically shows how two such air deflectors may be set to deflect the air currents to come together from opposite sides of an automobile body, as represented by the dotted lines and arrows. This collision of the air currents at a central position scatters or disperses the air currents and releases the fresh air as a gentle diffusion from a central point so that any discomfort of the rear seat passengers is avoided, or the deflectors may be set in various other positions for merely deflecting the air away from a sensitive passenger.

The air deflectors, when not in operation, are conveniently folded down along the top of the back of the front seat to an unobstructive and retracted position, as represented in dotted lines in Figs. 1 and 2.

The air deflector members 11 are preferably of substantially L-shaped cross-section or a curved cross section, as may be seen from the end views shown in Figs. 4 and 5. These deflectors may be folded down snugly in a very compact relation over the top and back of the front seat and such shapes make these elements very effective in capturing and deflecting the air currents to be controlled. However, a flat air deflector, as shown in Fig. 6, may be utilized in such an arrangement and it may be folded down adjacent the seat back.

Such air deflectors are made of flat or sheet material which is preferably one of the transparent plastic composition materials, although fiber sheet, sheet aluminum or other materials may be advantageously utilized as will be readily understood.

The adjustable mountings 13 are preferably universallly adjustable so that the air deflectors 11 may be set to a wide variety of positions to suit the preference of the passengers. As Figs. 7 and 8 show, each such mounting may consist of a base or bracket 21 centrally apertured to provide four upturned fingers 23 for receiving and holding a ball 25 from which an arm 27 extends, as in my previously mentioned copending application. A frictional brake 29 is provided in the base for gripping the ball 25, to which it is clamped by screws 31 which may be adjusted to provide the amount of friction desired. The arm 27 extends for attachment to one end of an air deflector 11, as by means of flat plates 33 clamped to opposite sides of the deflector by means of screws 35. The flat plates 33 may be integral with the arm 27, or these may be attached by welding, for extension in spaced relation from the end of the arm. If desired, the extended end of the arm 27 may also be provided with a joint ball 37 and the clamp plates 33 may be separate from the arm for clamping upon this ball in a universally adjustable manner, as in said copending patent application. The hardware is preferably provided with chromium plating or any other pleasing finish.

As such an arrangement provides a very effective air draft control which is easily operated by the rear seat passengers, the front seat passengers also enjoy greater comfort in having the front door windows open to suit their own requirements.

It is apparent that within the scope of my invention modifications and different arrangements may be made other than herein disclosed, and the present disclosure is illustrative merely, the invention comprehending variations thereof.

What is claimed as the invention is:

1. An automobile draft control arrangement comprising, a closed automobile body having a front seat and a rear seat, an elongated air deflector suitable for deflecting air currents in said body, a mounting base secured on the back of the front seat adjacent one side of the body, pivotal means attaching said air deflector adjustably to said mounting base for movement to be set adjacent the side of the automobile or at various angular or inclined positions to deflect rearwardly flowing air currents to suit the comfort of passengers in the rear seat or to an unobstructive folded position adjacent the upper and back portion of the front seat, said air deflector having a substantially L-shape cross-section for fitting over and along the upper rear portion of the seat back when folded thereon, and said pivotally adjustable means being a universally adjustable ball joint to hold the air deflector in a wide range of different positions to suit the comfort of the passengers in the rear seat.

2. An automobile draft control arrangement comprising, a closed automobile body having a front seat and a rear seat, an elongated air deflector having a curved cross-section suitable for deflecting air currents in said body, a mounting base secured in said automobile body on the back of the front seat adjacent one side of the body, and pivotally adjustable means extending from one end of said elongated air deflector and adjustably connected to said mounting base so that said elongated deflector may be set up adjacent the side of the automobile or at various angular or inclined positions to capture rearwardly flowing air currents and to conduct or deflect such captured air currents to suit the comfort of passengers in the rear seat, or to be disposed in an unobstructive folded position with the curved cross-section of the deflector extending lengthwise over and along the top and back portion of the front seat when draft control is not desired.

3. An automobile draft control arrangement in accordance with claim 2 and further characterized by said air deflector having a cross-section which is substantially L-shaped for more effectively controlling the air currents in the closed automobile body and for fitting over and lengthwise along the upper rear portion of the back of the front seat when folded thereon in an unobstructive position.

4. An automobile draft control arrangement in accordance with claim 2 and further characterized by said pivotally adjustable means being a universally adjustable ball-joint to facilitate adjustment of the air deflector to many desirable control positions as well as to facilitate folding the elongated air deflector down to an unobstructive position over and lengthwise along the top and back portion of the front seat.

KENNETH C. SINCLAIR.

References Cited in the file of this patent

UNITED STATES PATENTS

| Number | Name | Date |
| --- | --- | --- |
| 1,219,513 | Wensinger | Mar. 20, 1917 |
| 1,515,982 | Willard | Nov. 18, 1924 |
| 1,812,362 | Nisbet | June 30, 1931 |
| 1,849,176 | De Fries | Mar. 15, 1932 |
| 1,950,329 | Singer | Mar. 6, 1934 |
| 2,072,648 | Randall | Mar. 2, 1937 |
| 2,141,442 | Mead et al. | Dec. 27, 1938 |
| 2,252,716 | Levy | Aug. 19, 1941 |
| 2,442,821 | Menrath | June 8, 1948 |